United States Patent
Hanson et al.

(10) Patent No.: US 9,176,748 B2
(45) Date of Patent: Nov. 3, 2015

(54) CREATING PRESENTATIONS USING DIGITAL MEDIA CONTENT

(75) Inventors: Eric Hanson, Emeryville, CA (US); Joshua David Fagans, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 1124 days.

(21) Appl. No.: 13/070,594

(22) Filed: Mar. 24, 2011

(65) Prior Publication Data

US 2011/0234615 A1    Sep. 29, 2011

Related U.S. Application Data

(60) Provisional application No. 61/317,525, filed on Mar. 25, 2010.

(51) Int. Cl.
G09G 5/02   (2006.01)
G06F 9/44   (2006.01)

(52) U.S. Cl.
CPC .................................. *G06F 9/4443* (2013.01)

(58) Field of Classification Search
CPC ........................................................ G09G 5/02
See application file for complete search history.

(56) References Cited

U.S. PATENT DOCUMENTS

| | | | |
|---|---|---|---|
| 5,974,198 A * | 10/1999 | Hamburg et al. | 382/284 |
| 6,396,963 B2 | 5/2002 | Shaffer et al. | |
| 6,587,596 B1 * | 7/2003 | Haeberli | 382/283 |
| 6,753,974 B1 * | 6/2004 | Hoel et al. | 358/1.15 |
| 6,809,741 B1 * | 10/2004 | Bates et al. | 345/597 |
| 6,973,453 B2 | 12/2005 | Culp et al. | |
| 7,262,778 B1 * | 8/2007 | Edwards et al. | 345/589 |
| 7,529,429 B2 | 5/2009 | Rother et al. | |
| 7,545,521 B2 | 6/2009 | Hanamoto et al. | |
| 7,627,354 B2 * | 12/2009 | Khazaka et al. | 455/575.1 |
| 2003/0021468 A1 * | 1/2003 | Jia et al. | 382/162 |
| 2003/0152291 A1 * | 8/2003 | Cheatle | 382/296 |
| 2003/0156760 A1 * | 8/2003 | Navon et al. | 382/237 |
| 2005/0157926 A1 * | 7/2005 | Moravec et al. | 382/173 |
| 2005/0210019 A1 * | 9/2005 | Uehara et al. | 707/3 |

(Continued)

FOREIGN PATENT DOCUMENTS

WO    WO2008079286 A9    6/2009

OTHER PUBLICATIONS

Photoshop question: how to bring a layer to the front, 2007, pp. 1-2.*

(Continued)

*Primary Examiner* — Stephen R Koziol
*Assistant Examiner* — Phong Nguyen
(74) *Attorney, Agent, or Firm* — Fish & Richardson P.C.

(57) ABSTRACT

Methods, systems, and apparatus, including computer programs encoded on a computer storage medium, for creating presentations using digital media content. In one aspect, input is received to position a first graphical element, such as a digital image, over a second graphical element to create a digital presentation. By analyzing a first feature associated with the first graphical element, it is determined that the first feature is incompatible with a second feature associated with the second graphical element. The second feature is dynamically and automatically modified to be compatible with the first feature, and the first graphical element is displayed over the second graphical element that is associated with the modified second feature, in response to the input.

41 Claims, 10 Drawing Sheets

(56) References Cited

U.S. PATENT DOCUMENTS

| | | | |
|---|---|---|---|
| 2006/0044324 A1* | 3/2006 | Shum et al. | 345/595 |
| 2006/0132872 A1* | 6/2006 | Beretta | 358/518 |
| 2008/0101762 A1* | 5/2008 | Kellock et al. | 386/52 |
| 2008/0155422 A1* | 6/2008 | Manico et al. | 715/731 |
| 2008/0282147 A1* | 11/2008 | Schorr | 715/247 |
| 2008/0304808 A1 | 12/2008 | Newell et al. | |
| 2009/0106671 A1 | 4/2009 | Olson et al. | |
| 2010/0141658 A1* | 6/2010 | Danton et al. | 345/441 |
| 2010/0201709 A1* | 8/2010 | Yang et al. | 345/629 |
| 2011/0285748 A1* | 11/2011 | Slatter et al. | 345/629 |
| 2012/0127198 A1* | 5/2012 | Gundavarapu | 345/629 |

OTHER PUBLICATIONS

Seashore—The Incomplete Guide, Seashore, 2004.*

* cited by examiner

| FEATURES | Compatible Ftrs | Incompatible Ftrs |
|---|---|---|
| 1 | 2, 4, 7, ... (n-2) | 3, 5, 6, ... (n-1), n |
| 2 | 1, ... 9, 10, ... | 5, ... 7, ..., (n-m), ... |
| 3 | | |
| | | |
| n | | |

CREATING PRESENTATIONS USING DIGITAL MEDIA CONTENT

CROSS REFERENCE TO RELATED APPLICATIONS

This application claims priority from U.S. Provisional Application No. 61/317,525, filed Mar. 25, 2010, and titled "Creating Presentations Using Digital Media Content," the entirety of which is incorporated herein by reference.

TECHNICAL FIELD

This specification relates to creating presentations using various items of digital media content, for example, graphical elements such as digital images.

BACKGROUND

Digital media items include digital representations of content, such as, images, music, video, documents, and the like. Such media can be stored in electronic format, for example, JPEG, AVI, PDF, and transferred electronically, for example, from one data storage device to another, through electronic mail or other electronic communication avenues. The media can be created in any of several ways. For example, digital still and video images can be captured using digital recorders and cameras, digital documents can be created by any of several techniques including using suitable computer software applications, scanning hard-copies of documents, and the like, and digital music or other audio tracks can be created using digital audio recorders. Managing a digital media item generally involves performing one or more operations on the media items including creating, storing, transferring, editing, viewing, presenting, or the like.

In some scenarios, presenting a digital media item includes creating a composite presentation using other media items. For example, multiple digital images can be collectively displayed on a slide, which can be included in a slide show of digital images.

SUMMARY

This specification describes technologies relating to dynamically manipulating or otherwise managing digital media items to facilitate the creation of aesthetically pleasing presentations, for example, either for electronic presentation or for presentation to be printed in an ink and paper format.

In general, one innovative aspect of the subject matter described in this specification can be implemented as a method implemented by one or more data processing apparatuses. Input specifying first and second graphical elements to be used to create a digital presentation are received. Each graphical element is associated with a corresponding feature. A first feature associated with the first graphical element is obtained. The first feature is compared with a second feature associated with the second graphical element to determine whether the first feature is compatible with the second feature. The second feature is modified to be compatible with the first feature in response to determining that the second feature is to be modified based on the comparing. The modified second feature is selected from among one or more features with which the first feature is compatible. The first graphical element is displayed substantially adjacent to the second graphical element in response to the input to create the digital presentation. The second graphical element is associated with the modified second feature.

This, and other aspects, can include one or more of the following features. It can be determined that the second feature is to be modified based on the comparing. The input specifying the first and the second graphical elements to be used to create the digital presentation can further include input to position the first graphical element substantially adjacent to the second graphical element. Displaying the first graphical element substantially adjacent to the second graphical element can include positioning the first graphical element to at least partially overlap the second graphical element. A graphical element can include a digital image. The digital image can be selected from multiple digital images stored in a database of digital images in response to the input. The digital image can be captured using an image capturing device. Modifying the second feature can include modifying the second feature automatically and dynamically upon receiving the input. The first graphical element and the second graphical element can each be displayed on a corresponding graphical layer of multiple graphical layers that are arranged in an order and are configured to display graphical elements in the order. The multiple graphical layers can be arranged in a Z-order such that a graphical layer is displayed over another graphical layer. The first graphical element, displayed on a first graphical layer, can be positioned below the second graphical element displayed on a second graphical layer. Input to position the first graphical element above the second graphical element can be received. The first graphical element can be displayed on the second graphical layer and the second graphical element on the first graphical layer. The modified second feature can be compared with the first feature. It can be determined that the first feature is to be modified. The first feature can be modified to be compatible with the modified second feature. The first graphical element having the modified first feature can be displayed above the second graphical element having the modified second feature. Obtaining the first feature associated with the first graphical element can further include analyzing metadata associated with the first graphical element. The first graphical element can include a digital image, and obtaining the first feature associated with the first graphical element can further include analyzing content of the digital image. Analyzing the content of the digital image can include obtaining pixel information that describes the content. The pixel information can include color. Multiple features including the first feature and the second feature can be stored in a computer-readable database. For each stored feature, one or more features with which the stored feature is compatible and one or more features with which the stored feature is compatible can be stored. Comparing the first feature with the second feature can include searching for the first feature in the database, and searching the database to determine if the second feature is included among the one or more features with which the first feature is compatible or among the one or more features with which the first feature is incompatible.

Another innovative aspect of the subject matter described here can be implemented as a computer storage medium encoded with a computer program including instructions executable by data processing apparatus to perform operations including receiving input to display multiple graphical elements on multiple layers arranged over each other in a sequence, each graphical element having a feature; analyzing a first graphical element to be displayed on a first layer to determine a first feature of the first graphical element; determining that a second graphical element to be displayed on a second layer has a second feature with which the first feature is incompatible; modifying the second feature of the second graphical element into a third feature with which the first feature is compatible; and displaying the multiple graphical elements on the multiple layers, the multiple graphical elements including the first graphical element having the first feature displayed on the first layer and a second graphical element having the third feature displayed on the second layer.

This, and other aspects, can include one or more of the following features. A feature can include one or more of a size, a color, a rotation, and an orientation. Each of the multiple layers can be two dimensional in the XY plane. Arranging the multiple layers over each other in the sequence can include arranging the multiple layers in the Z direction. The first graphical element can be a digital image including content. Analyzing the first graphical element can include obtaining pixel information that describes the content from the digital image. The first feature can be an orientation of the digital image. The orientation can include either a landscape orientation or a portrait orientation. The first graphical element can include text and the first feature can include a font in which the text is written. Analyzing the first graphical element can include obtaining the text and the font. The operations can further include analyzing the second graphical element to be displayed on the second layer to determine the second feature of the second graphical element, and comparing the first feature with the second feature and a position of the first layer with a position of the second layer in the sequence. The first feature can be a first color and the second feature can be a second color. The operations for comparing the first feature with the second feature and the position of the first layer with the position of the second layer in the sequence can include determining that the first color and the second color share a similarity. The operations for modifying the second feature of the second graphical element into a third feature with which the first feature is compatible can include modifying the second color into a third color that contrasts the first color. The first feature and the second feature can be drop-shadows displayed on a first background of the first graphical element and a second background of the second graphical element, respectively. The first layer can be positioned below the second layer. The operations can further include displaying a drop-shadow on the second background more prominently relative to a drop-shadow on the first background. The operations for modifying the second feature of the second graphical element into a third feature with which the first feature is compatible can include receiving input to position the second layer below the first layer, and modifying the drop-shadow displayed on the first background to be more prominent than the drop-shadow displayed on the second background. The modified drop-shadow can be the third feature. The operations can further include storing multiple features in a database, and, for each of the multiple features, storing in the database, one or more compatible features and one or more incompatible features. The operations for determining that the second graphical element to be displayed on the second layer has the second feature with which the first feature is incompatible can include searching the database for the second feature; identifying, in the database, the one or more features with which the second feature is incompatible; and identifying the first feature among the one or more identified features with which the second feature is incompatible.

Another innovative aspect of the subject matter described here can be implemented as a system that includes one or more computers; and a computer-readable medium tangibly encoding software instructions executable by the one or more computers to perform operations described in this specification.

Particular implementations of the subject matter described in this specification can be implemented so as to realize one or more of the following potential advantages. Displaying graphical elements with modified features can enhance an aesthetic appearance of a digital media presentation. When a user provides input to position a graphical element associated with a feature adjacent to, for example, on top of, another graphical element associated with another feature, a compatibility of the two features can be automatically determined, i.e., without further user intervention and user input. Based on the determination, a feature of one or both of the graphical elements can be automatically and dynamically modified to maintain and/or improve an aesthetic appearance of the two graphical elements.

For example, a digital media presentation can include displaying a digital image in a digital spread having an appearance of a photo album. A feature associated with the digital media presentation can be the display of a drop-shadow around the image, particular the corners, such that the digital image has an appearance similar to a hard copy of a photograph whose corner is curling out of the page in the photo album. The placement of another digital image over the digital image in the digital presentation can be automatically detected, and the display of the drop-shadow can be automatically modified to simulate an appearance similar to the hard copy of two photographs positioned over each other in a photo album. Generally, the techniques described here allows automatic and dynamic modifying to maintain an organic feel to the digital media presentation.

The automatic modifying of features can eliminate or at least minimize the need for a user to manually modify features to compensate for any loss in aesthetic appearance. Upon determining that the two features are incompatible, one of the features can be automatically and dynamically modified. In other words, the features can be modified as the user is arranging multiple graphical elements in a digital media presentation. Further, graphical elements can be associated with features that are selected by analyzing the elements themselves. The features can be associated with the multiple graphical elements to create a theme that can be used to collectively present the graphical elements in a digital media presentation. Hard copies of the digital presentations created in this manner can be generated.

Details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is an example of a table in which features associated with graphical elements are listed.

Like reference numbers and designations in the various drawings indicate like elements.

DETAILED DESCRIPTION

Figure 1A:
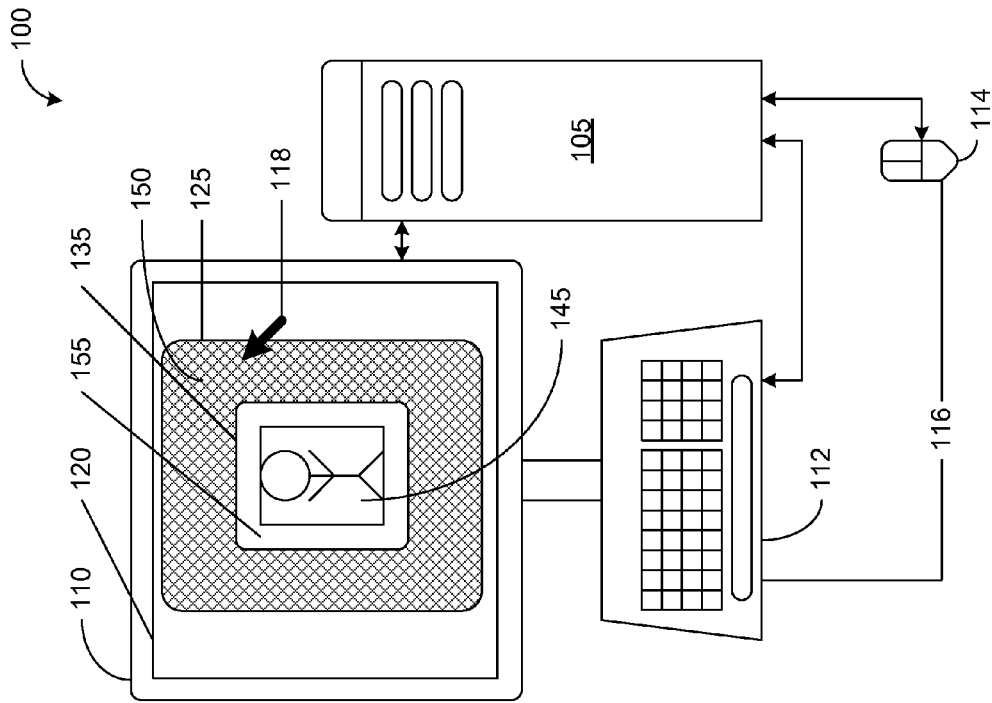
FIGS. 1A and 1B are examples of a system 100 for modifying features of graphical elements in digital media presentations.

Digital media items, for example, digital images, digital video, digital audio, and the like, can be captured using one of many available devices. The captured media items can be stored in one of several formats, for example, JPG (digital image), MOV (digital video), MP3 (digital audio), on data storage devices, and can be transferred from the data storage devices to data processing apparatuses, for example, a desktop computer, a laptop computer, a personal digital assistant (PDA), and the like, for further processing. Such processing can include creating a digital media presentation using the captured digital media items. For example, a digital media presentation includes multiple digital images that are presented in a display device, for example, a liquid crystal display (LCD). Such digital media presentations can be stored as projects and can also be printed using image printing techniques that are known. Methods, computer-readable media, and systems, described with reference to the following figures, can be implemented to create digital media presentations that include multiple graphical elements, for example, digital images.

In some scenarios, a digital media presentation can include multiple graphical elements displayed adjacent to each other. For example, two or more graphical elements can be positioned adjacent to each other on the same XY plane. Alternatively, or in addition, two or more graphical elements can be positioned in a Z-order sequence in a direction that is perpendicular to the XY plane. Each graphical element can be positioned on a corresponding layer; more than one graphical element can be positioned on the same layer. The layers can include a background layer, a masking layer, a frame, an overlay layer, and the like. A graphical element positioned on a layer can be a digital image, for example, a photograph captured using a digital camera, that includes pixel information representing the content of the digital image and metadata representing information about the digital image and the digital image data file. A graphical element can also include pre-defined geometric and non-geometric shapes that have modifiable features such as a shape, a size, a color, a rotation, and the like.

Each feature associated with a graphical element is a trait of the graphical element. A collection of traits represent a treatment associated with the graphical element. For example, a digital image of a square can be a graphical element that has the following features –3.5" long side, solid black color, 45° rotation. Each of these features represents a trait of the square image. Collectively, the features represent a treatment of the image of the square. Each of the features is modifiable, i.e., the length of the side, the color of the filling, the rotation, can be individually or collectively modified. Whereas in some scenarios, the features are modified responsive to user input, in other scenarios, the features can be modified automatically and dynamically in response to the features associated with the graphical elements adjacent to which the image of the square is positioned.

A digital media presentation is composed using multiple graphical elements. Each graphical element possesses one or more traits. In addition to features associated with the graphical element itself, for example, a size, a color, an orientation, and the like, metadata associated with the graphical element are also traits of the element. For example, if the graphical element is a digital image, then a file format in which the digital image is stored is a trait of the image. Typically, when a digital image is captured using a digital camera, the digital image and settings of the camera (for example, focal length, aperture, and the like) are stored in a digital file. The settings of the camera are also traits of the digital image. Traits can also be derived from the graphical element. For example, for a digital image captured using a camera, traits such a location of capture, a time of capture, a level of brightness/darkness upon capture, presence/absence of faces can be derived from the captured digital image. The combination of traits of all graphical elements in a digital media presentation collectively creates an environment for the presentation.

In some scenarios, a dynamic shadow generating engine can be used to associate drop-shadows with digital images. The shadow generating engine can include data processing apparatus that execute computer software instructions that receive a digital image and generate graphical elements that have an appearance of a shadow for the image. Because the shadow generating engine can dynamically alter the shadow associated with the image based, for example, a position of the image in a presentation, each shadow that the shadow generating engine associates with the digital image is also a trait of the image.

A feature is automatically modified without user input or user intervention. A feature is dynamically modified as the graphical elements are being arranged to create a digital media presentation. In some scenarios, if multiple graphical elements are arranged on a background graphical element, then the features of the multiple graphical elements can be dynamically and automatically modified based on the feature of the background graphical element. For example, if the background graphical element has a vibrant color, then the colors of the multiple graphical elements can also be modified to be vibrant. In this manner, the background can have a foundational trait that influences other traits in digital media presentation. An example of a system for doing so is described with reference to FIGS. 1A and 1B.

Figure 1B:
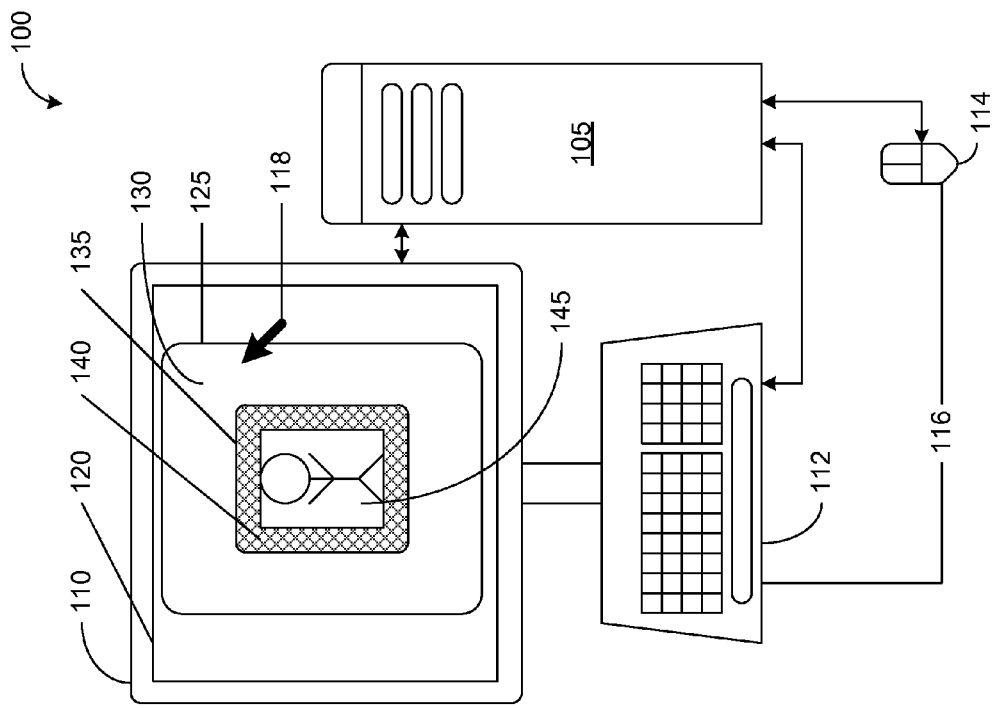

FIGS. 1A and 1B are examples of a system 100 for modifying features of graphical elements in digital media presentations. The system 100 includes a data processing apparatus, for example, a computing device 105, that is operatively coupled to a display device 110, and a keyboard 112 and a mouse 114, that collectively represent input devices 116. Using the input devices 116, a user of the computing device 105 can provide input to the computing device 105. The computing device 105 receives and processes the input, and displays the output in the display device 110. In some scenarios, using the mouse 114, the user can control a cursor 118 displayed in the display device 110. A user interface 120 can be displayed in the display device 110. The computing device 105 can execute computer software instructions to implement the techniques of creating a digital media presentation by displaying graphical elements in the user interface 120. It will be appreciated that the computing device 105 can be operatively coupled to alternative and/or additional input and output devices.

To create a digital media presentation, the computing device 105 can receive input from the input devices 118 to display graphical elements in the user interface 120. In the scenarios described with reference to FIGS. 1A and 1B, the computing device 105 receives input to display a digital image 145 in the user interface 120. In response to input, the computing device 105 displays a first graphical element 130 in a first layer 125 in the user interface 120. The first graphical element 130 can be a pre-defined geometric or non-geometric shape and can have one or more associated features including a color, a size, a shape, an orientation (landscape or portrait), a rotation, and the like. Alternatively, the first graphical element 130 can be a digital image that is uploaded from a data storage device and displayed in the first layer 125. In the alternative scenario, the first graphical element can include pixel information describing the digital image content and image metadata. From the pixel information, the computing device 105 can determine prominent colors across the digital image and prominent colors in portions of the image. In addition, the digital image can include modifiable features such as an image size, an image rotation, and the like. For example, in response to input, the computing device 105 displays a rectangular, white background in a portrait orientation in the first layer 125.

Subsequently, the computing device 105 receives input to display a digital image 145 over the first graphical element 125. In response, the computing device 105 displays a second graphical element 140 in a second layer 135 over the first graphical element 125, and within the second graphical element 140 displays the digital image 145. In some scenarios, the digital image is stored in and retrieved from a data storage device operatively coupled to the computing device 105. The second graphical element 140 can be a bounded region that forms a border around the edges of the digital image 145. Further, the second graphical element 140 can have associated features such as a border width, a border color, and the like.

In some implementations, the computing device 105 can select features of the second graphical element 140 based on features of the first graphical element 140. To do so, the computing device 105 can identify the features of the first graphical element 125 and then identify one or more features with which the features of the first graphical element 125 are compatible and one or more features with which the features of the first graphical element 125 are not compatible. For example, if a color of the first graphical element 130 is white, then a white color on the second graphical element 140 is an incompatible feature because the white color of the second graphical element 140 will not be visible when the second graphical element 140 is positioned over the first graphical element 130. In contrast, black or a similar dark color is compatible with the white color of the first graphical element 130 because the black or the similar dark color will be visible when the second graphical element 140 is positioned over the first graphical element 130. Black and white are examples of a pair of compatible features of graphical elements. Thus, in a default implementation, the computing device 105 can automatically associate black color with the second graphical element 140 and display the digital image 145 over the second graphical element 140 such that the digital image 145 has a black border over a white page. Subsequently, responsive to user input, the color of the computing device 105 can modify the color of the second graphical element 140.

Compatibility and incompatibility of features can be determined with reference to an aesthetic appearance of the digital media presentation. For example, black and white are compatible colors because not only can black color on a white back ground be easily discernible, but also the combination can be aesthetically pleasing. Thus, in general, two features associated with corresponding graphical elements positioned adjacent to each other are compatible if the appearance of both features in the digital media presentation displaying the two graphical elements will enhance the aesthetic appearance of the presentation. Conversely, if the two features will decrease the aesthetic appearance of the digital media presentation, then the features are considered to be incompatible with each other.

It will be appreciated that several pairs of compatible and incompatible colors can be identified, one of which the computing device 105 can automatically select and associate with two graphical elements to be positioned adjacent to each other. In some scenarios, the compatibility of two features associated respectively with two graphical elements can be independent of other graphical elements in the digital media presentation. In such scenarios, regardless of other features, black color and white color can be considered as being compatible. In some scenarios, the compatibility of two features can depend on the features of other graphical elements. Thus, whereas black and white are compatible in a presentation including certain graphical elements, black and white may not be compatible in another presentation; rather black and grey can be compatible. In other words, the rules that determine compatibility of two features can be dynamically modified based on other features.

As shown in FIG. 1B, the computing device 105 receives input to modify a feature of the first graphical element 130. For example, the computing device 105 receives input to modify the color of the first graphical element 130 from white to black. Responsive to the input, the computing device 105 modifies the feature of the first graphical element 130. In response, the computing device 105 can compare the modified feature of the first graphical element 130 with the feature of the second graphical element 140. Based on the comparing, the computing device 105 can determine that the feature, i.e., color, of the second graphical element 140 is incompatible with the modified feature of the first graphical element 130. Automatically, i.e., without user input or user intervention, the computing device 105 can modify the feature of the second graphical element 140 to a feature with which the modified feature of the first graphical element 130 is compatible. Further, the computing device 105 can modify the feature dynamically, i.e., without waiting for a completion of the modification of other features of either or both of the graphical elements that are displayed in the user interface 120. By doing so, the computing device 105 can display an effect of modifying a feature of the graphical element almost instantaneously to the user.

The example scenario described with reference to FIGS. 1A and 1B describes automatically and dynamically modifying one feature, i.e., a color, responsive to receiving input to modify one other feature, also color. It will be appreciated that features other than color, for example, size, rotation, orientation, and the like, can also be modified. For example, a shadow associated with an image can be automatically and dynamically modified by the system described with reference to FIGS. 1A and 1B. Additionally, changes to texture of the presentation, addition and/or removal of patterns, are other features that can be modified. For example, when the computing device 105 receives input to position a digital image captured at a location within a digital frame included as part of the digital media presentation, the computing device 105 can identify a theme for the digital media presentation based on the location at which the digital image was captured. The computing device 105 can determine the location of capture from the features associated with the digital image (i.e., the metadata). If the computing device 105 determines that the location is a tropical location, then the computing device 105 can automatically and dynamically modify the appearances of other graphical elements in the presentation to have a tropical theme.

To do so, in some implementations, the computing device 105 can access a database of presentation layouts that includes a tropical theme layout. A layout is a collection of treatments that can be associated with graphical elements in a digital media presentation. All treatments in the collection are selected based on a relationship to a common theme. Another theme that relates a collection of treatments can be geography. For example, by analyzing the metadata, the computing device 105 can determine that multiple images included in a digital media presentation were captured in Europe. In response, the computing device 105 can automatically select a European themed layout to present the digital images. Asian theme is another example of a geographical theme that relates a collection of treatments that the computing device 105 can select.

Another feature of a digital image based on which the computing device 105 can modify other features of other images in a digital media presentation is a presence or absence of a face in a digital image. The computing device 105 can be configured to detect the presence of faces and to detect a region occupied by the faces. Based, for example, on an orientation of the digital image and a size of a region occupied by a face, the computing device 105 can determine that the digital image is a portrait image. When the computing device 105 receives input to include such an image in a digital media presentation, the device 105 can automatically modify the features of the background layer on which the digital image is displayed or the frame within which the digital image is displayed (or both) to appear as a Polaroid. Alternatively, if the computing device 105 determines that the digital image is an image of scenery (for example, based on landscape orientation, absence of faces, features obtained from the digital camera), the computing device 105 can modify the features of other graphical elements to appear as a postcard.

Such automatic and dynamic modifying of features represent behaviors that the graphical elements exhibit in response to a modification in features (i.e., traits) of adjacent graphical elements. Further, a feature associated with a graphical element can be automatically and dynamically modified upon detecting simultaneous modifications to multiple features of another graphical element. For example, if a black color and solid fill of the first graphical element 130 are simultaneously modified to yellow color and a 70% transparency, then a white color and solid fill of the second graphical element 140 can be simultaneously modified to have features compatible with the modified features of the first graphical element. In some scenarios, the computing device 105 can determine that the existing features of the second graphical element 140 are compatible with the modified features of the first graphical element 130. In such scenarios, the computing device 105 need not modify the features of the second graphical element 140 upon receiving input to modify the features of the first graphical element 130.

In some implementations, the computing device 105 can collectively identify multiple features by a common feature. For example, "Dark" is a common feature that includes black, brown, navy blue, and other similar dark colors. Similarly, "Bright" is a common feature that includes white, sky blue, yellow, and other bright colors. To determine compatible and incompatible colors, the computing device 105 can first identify a color associated with a graphical element, and determine if the identified color falls within "Dark" or "Light." Depending upon the common feature, the computing device 105 can then identify compatible and incompatible colors. As described previously, colors are just one type of features that can be associated with graphical elements and that the computing device 105 can automatically and dynamically modify upon receiving input to modify features associated with other graphical elements. Another example of graphical elements, the features of which the computing device 105 can automatically and dynamically modify, are art work elements described with reference to FIGS. 2A and 2B.

As described previously, in some scenarios, the first graphical element 130 can be a digital image that is uploaded from a data storage device and displayed in the first layer 125. When the computing device 105 receives input to display the digital image, the computing device 105 may not know any information about the digital image, i.e., the content, the metadata, and the like. The computing device 105 is configured to analyze the digital image, i.e., the content and the metadata, to obtain features of the digital image. For example, by analyzing the pixel information associated with the digital image, the computing device 105 determines prominent colors in the digital image. Alternatively, or in addition, the computing device 105 determines that the image is a busy image or a serene image. Based on analyzing the metadata, the computing device 105 determines that the image is a portrait image of a person or a landscape image of a scenery. The computing device 105 can compare the features thus identified with features of the graphical elements on which the image is to be displayed to determine compatibility and incompatibility.

Figure 2A:
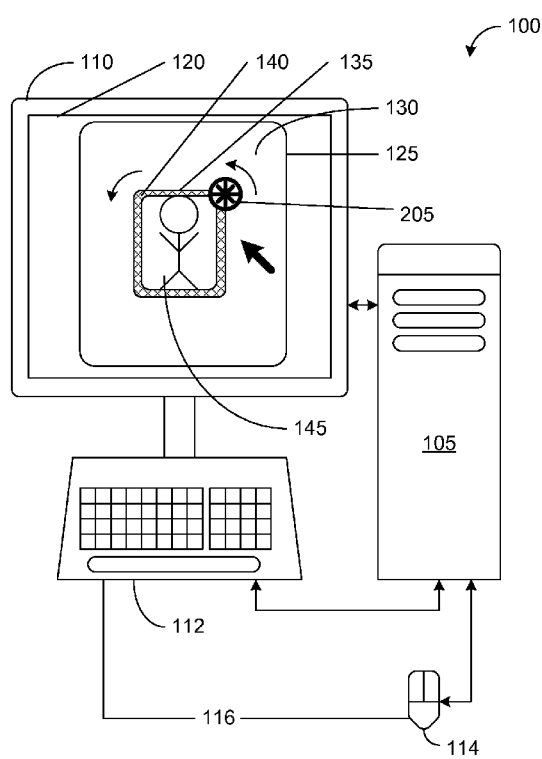
FIGS. 2A and 2B are examples of a system 100 for modifying locations of art work elements associated with graphical elements in digital media presentations.
Figure 2B:
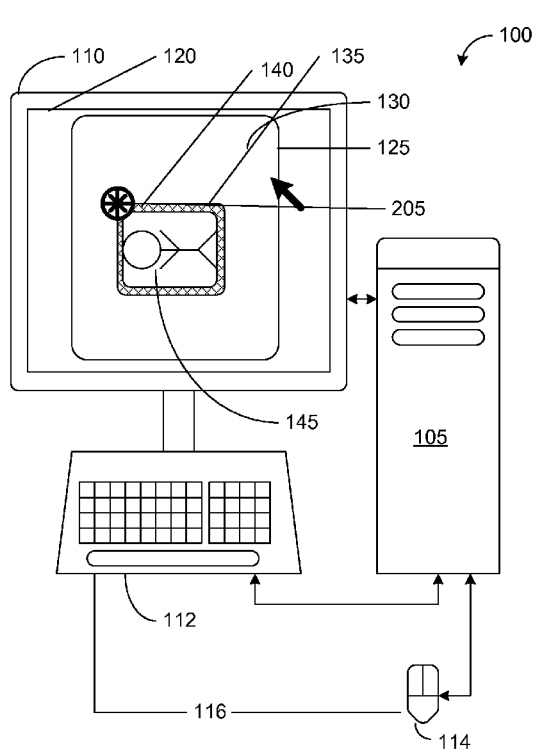

FIGS. 2A and 2B are examples of a system 100 for modifying locations of art work elements associated with graphical elements in digital media presentations. Art work elements include graphical elements that the computing device 105 associates with graphical elements, such as digital images, that are displayed in the digital media presentation. The computing device 105 can select an art work element based on content of a digital image and/or based on a contextual theme that commonly represents multiple digital images. For example, if a digital image shows a picture of a popular landmark that is located at a geographic location that is different from a user's home, then the artwork element can be an image of a postage stamp indicating that the user was traveling when the user captured the picture of the landmark. Additional examples of art work elements can include an image of an olive branch, an image of a passport stamp, Chinese symbols, and the like.

In some implementations, the computing device 105 is operatively coupled to a database that stores images of popular landmarks. The computing device 105 receives input to receive the digital image that shows the picture of the popular landmark and analyzes the digital image. Analyzing the digital image can include analyzing the content of the digital image, i.e., pixel information, or metadata associated with the digital image, or both. Based on the analysis, the computing device 105 can extract the picture shown in the digital image and can identify that the extracted picture is a popular landmark by comparing the picture with the images stored in the database that stores images of popular landmarks. The metadata associated with the digital image can include a time of capture and a geographic location of capture. By analyzing the metadata, the computing device 105 can determine that the digital image was captured at a location different from a geographic location of the computing device 105 (which can be the user's home, by default). Subsequently, based on the geographic location at which the image was captured and based on determining that the extracted picture is a popular landmark, the computing device 105 can display an art work element, for example, an image of a postage stamp adjacent to the digital image.

In some scenarios, the computing device 105 is configured to analyze multiple digital images grouped either responsive to user input or automatically and to identify a contextual theme that collectively represents all the images in the group. For example, the computing device 105 can determine that multiple digital images were captured at the same geographic location by analyzing the metadata associated with each of the multiple digital images. The computing device 105 can also determine that the same geographic location is different from the user's home, i.e., geographic location of the computing device 105. In such scenarios, the computing device 105 determines that the multiple digital images were captured while the user was on vacation and "Vacation" can become the contextual theme that collectively represents the multiple digital images. Also, in such scenarios, the art work element(s) can be an image or images of the geographic location that are displayed adjacent to the multiple digital images that the user has captured.

As shown in FIG. 2A, the computing device 105 displays the art work element 205 adjacent to the digital image 145. The art work element 205 is displayed in a corresponding layer, the digital image 145 is displayed in a corresponding layer 140, and both are displayed over the first graphical element 130, which is displayed on the first graphical layer 125. In some implementations, the computing device 105 anchors the art work element 205 to a position adjacent to the digital image 145, for example, to the top right corner of the layer 140 on which the computing device 105 displays the digital image 145.

The computing device 105 can receive input to modify a feature of the digital image 145. For example, the computing device 105 receives input to rotate the digital image 145 by 90° to the left. As shown in FIG. 2B, responsive to the input, the computing device 105 rotates the digital image 145 according to the input. When the computing device 105 rotates the digital image 145, the computing device 105 also rotates the layer 140 on which the digital image is positioned. Thus, the position of the layer 140 on which the computing device 105 had previously anchored the art work element 205 is also rotated according to the input. Upon detecting this translation of the anchor point of the art work element 205, the computing device 105 automatically re-positions the art work element 205 to the new position of the anchor point. To do so, in some implementations, the computing device 105 can detect a new position of the anchor point subsequent to the rotation, automatically translate the art work element 205 to the new position, and display the translated art work element at the new position.

In some implementations, the computing device 105 can be configured with rules regarding the display of some or all graphical elements. For example, a rule that at least a certain portion (for example, 75%) of the art work element 205 should always be displayed in the digital media presentation can be programmed into the computing device 105. Thus, after the art work element 205 is positioned adjacent to the digital image 145, if another digital image is positioned over the digital image 145 such that the art work element 205 will be hidden from display in the resulting presentation, the computing device 105 can automatically change a position of the art work element 205 such that at least the certain portion specified by the rules will be visible in the resulting digital media presentation. In some implementations, the computing device 105 can change a position of the art work element 205 immediately after another digital image that will hide the art work element 205 is added to the digital media presentation. Alternatively, the computing device 105 can wait until all input to create the digital media presentation have been received. Subsequently, the computing device 105 can identify a location in the digital media presentation at which the specified portion of the art work element 205 will be visible, and display the art work element 205 at that location. In some implementations, the rule can specify that all of the art work element 205 be displayed in the resulting digital media presentation.

In some implementations, the computing device 105 can receive input to modify a size of the digital image 145, for example, to increase a size of the digital image 145. In response to the input, the computing device 105 can display the digital image 145 in a bounded region of the size specified in the input and can also proportionally increase the size of the layer 140 on which the digital image 145 is displayed. The modification in the size of the digital image 145 repositions the anchor point to which the art work element 205 was anchored to a different position. The computing device 105 can detect a new position of the anchor point subsequent to the modification in the size, automatically translate the art work element 205 to the new position, and display the translated art work element at the new position.

In some implementations, the computing device 105 can receive input to replace the digital image 145 with a new digital image that has a different orientation relative to the digital image 145. For example, whereas the digital image 145 has a portrait orientation, the new digital image has a landscape orientation. An aspect ratio of the portrait orientation (for example, 4:3) is different from an aspect ratio of the landscape orientation (for example, 3:4). In response to receiving the input, the computing device 105 can replace the layer 140 on which the digital image 145 was displayed with a new layer that has an aspect ratio and size sufficient to display the new digital image. The computing device 105 can then display the new digital image in the new layer. Further, the computing device 105 can automatically reposition the art work element 205.

Because a rotation of the new digital image is same as that of the digital image 145, the anchor point of the art work element 205 on the new digital image is the same as that on the digital image 145, for example, the top right corner of the new layer. The computing device 105 can detect the top right corner of the new layer, automatically translate the art work element 205 to the detected position, and display the translated art work element at the detected position. The automatic translation of the art work elements based on modification to the features of the digital image represent behaviors that the art work element is configured to display. The computing device 105 can modify behaviors of art work elements in response to modifications to features of the digital images in addition to those described above. In other words, when input to modify treatments associated with digital images are received, the computing device 105 automatically and dynamically causes the art work elements to exhibit behaviors to be compatible with the modifications to the treatments. In combination with the modifications, the behaviors can enhance an aesthetic appearance of the digital media presentation. In addition, the behaviors can negate a need for a user to alter the features of the art work elements to compensate for any loss in aesthetic appearance of the presentation. It will be appreciated that in addition to automatic translation of the position of the art work element 205, colors associated with the art work element 205 can be automatically and dynamically modified in response to changes to colors of the layers, for example, the first layer 125, the second layer 135, and the like.

To implement the aforementioned methods, the computing device 105 receives input to modify a feature of a previously displayed graphical element and automatically and dynamically modifies features of other displayed graphical elements, in response to the input. In some implementations, the computing device 105 receives input to display a graphical element in a digital media presentation. In response, the computing device 105 identifies features of graphical elements that are already displayed in the digital media presentation, identifies positions of the graphical elements on corresponding layers. Based on the identified features and identified positions, and by analyzing the graphical element to be displayed, the computing device 105 determines features that can be associated with the graphical element. An example of such a computing device is described with reference to FIGS. 3A and 3B.

Figure 3B:
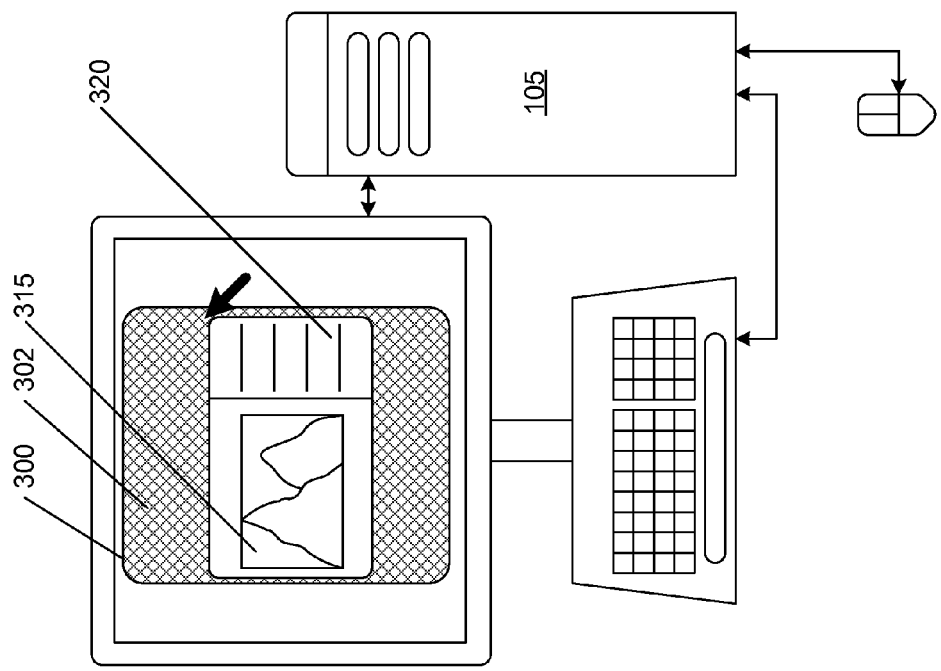
FIGS. 3A and 3B are examples of a system for determining features to be associated with graphical elements that are to be displayed in a digital media presentation.
Figure 3A:
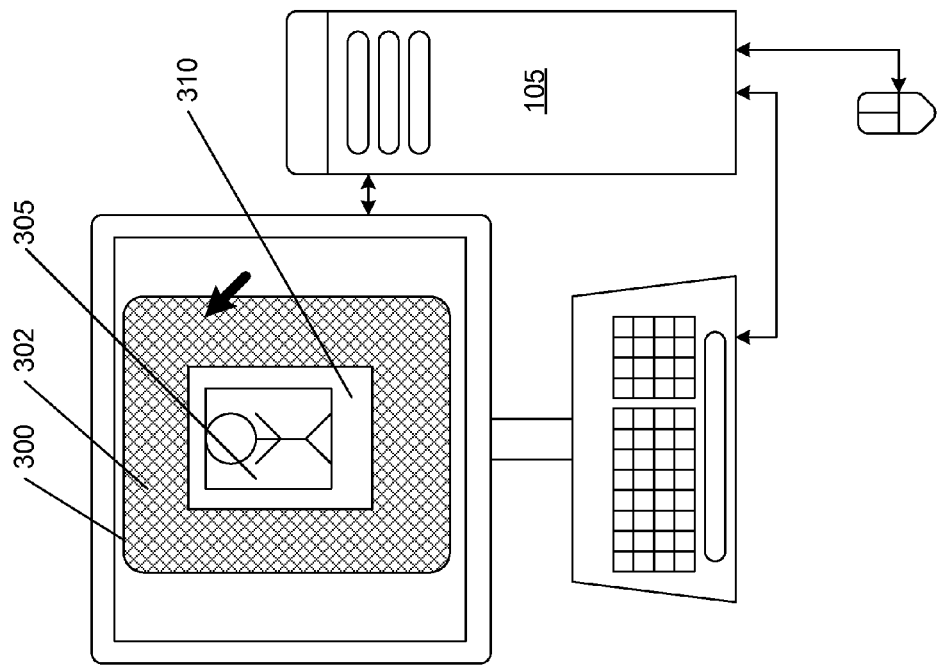

FIGS. 3A and 3B are examples of a system for determining features to be associated with graphical elements that are to be displayed in a digital media presentation. In some implementations, to create a digital media presentation, a user provides input to first display a background page and then provides input to display one or more digital images on the background page. As shown in FIG. 3A, in response to receive user input to display a background page, the computing device 105 displays a background page 302 on a background layer 300. The background page 302 shown in FIG. 3A can be associated with features that include a color, a size, a rotation, an orientation, and the like, each of which the computing device 105 can assign by default and modify responsive to user input.

To display a digital image 305 over the background page 302, a user can select the digital image 305 using one of several known techniques. The computing device 105 can analyze the digital image 305, for example, pixel information describing content of the digital image 305 and metadata associated with the digital image 305. For example, by executing known facial recognition techniques, the computing device 105 can determine that the image 305 is a portrait image that displays a photo of a person. Because the image 305 displays a photo of a person, the computing device 105 can determine to display the image 305 with a Polaroid appearance. To do so, the computing device 105 can select a graphical element 310 that has an appearance of a Polaroid frame and display the graphical element 310 over the background page 302. Within the graphical element 310, the computing device 105 can display the digital image 305 such that the digital image 305 is displayed as being surrounded by a border that appears as a Polaroid frame. In a default implementation, the computing device 105 can assign features to the graphical element 310 including a size, a rotation, and a width of the border. The computing device 105 can modify each of these features responsive to user input.

In an alternative implementation, the computing device 105 can analyze the digital image 305 to determine that the image 305 is an image that displays a photo of scenery. To do so, for example, the computing device 105 can analyze the image to determine that there are no faces or alternatively, if there are faces, that the region occupied by the faces is small and/or not near a center of the image. Because a photo of a person will typically include the person's face at or near a center of the image, the offset of the face from the center of the image serves as an indicator that the face is not the region of interest in the image. In addition, the computing device 105 can use metadata associated to the image by the digital camera (for example, focal length, aperture, and the like) to make a determination that the image is a photo of scenery. The computing device 105 can associate a score with each of these features. By combining the scores and comparing with a threshold, the computing device 105 can determine that the image is one of scenery.

Because the image 305 displays scenery, the computing device 105 can determine to display the image 305 with a postcard appearance. To do so, the computing device 105 can select a graphical element 310 that has an appearance of a postcard frame and display the graphical element 310 over the background page 302. In some implementations, the computing device 105 can additionally detect a geographic location in which the scenery is located (for example, using geographic location information included in the metadata associated with the image 305) and display the name of the geographic location in the postcard frame. Within the graphical element 310, the computing device 105 can display the digital image 305 such that the digital image 305 is displayed as a postcard. It will be appreciated that a Polaroid frame for a digital image of a person's face and a postcard frame for a digital image of scenery are only two examples of graphical elements that the computing device 105 can select by analyzing digital images. Other examples of borders can include a region-based border (for example, ornate border for images captured in Asian, old-world border for images captured in Europe), children-friendly borders for images of and/or associated with children, borders associated with schools when the images are associated with schools, and the like.

In some implementations, the computing device 105 can be operatively coupled to a data storage device that stores multiple graphical elements. Each graphical element can be associated with a digital image feature that the computing device 105 can find by analyzing the digital image; such digital image features can also be stored in the data storage device. Further, the data storage device can store a mapping between the digital image features and the graphical elements. Upon determining that a digital image has one of the digital image features stored in the data storage device, the computing device 105 can select a graphical element based on the stored mapping and can display the selected graphical element in the user interface as explained above. In some implementations, the computing device 105 can present all the available graphical elements in the user interface and permit a user to select an alternative graphical element or to select no graphical element. In response to the user's selection, the computing device 105 can modify the graphical element selected by the computing device 105 with the graphical element selected by the user. Techniques for doing so are described in U.S. Pat. No. 8,611,678 entitled "Grouping Digital Media Items Based on Shared Features" and U.S. Pat. No. 8,988,456 entitled "Generating Digital Media Presentation Layouts Dynamically Based on Image Features." The contents of both applications are incorporated herein by reference in their respective entirety.

Figure 4B:
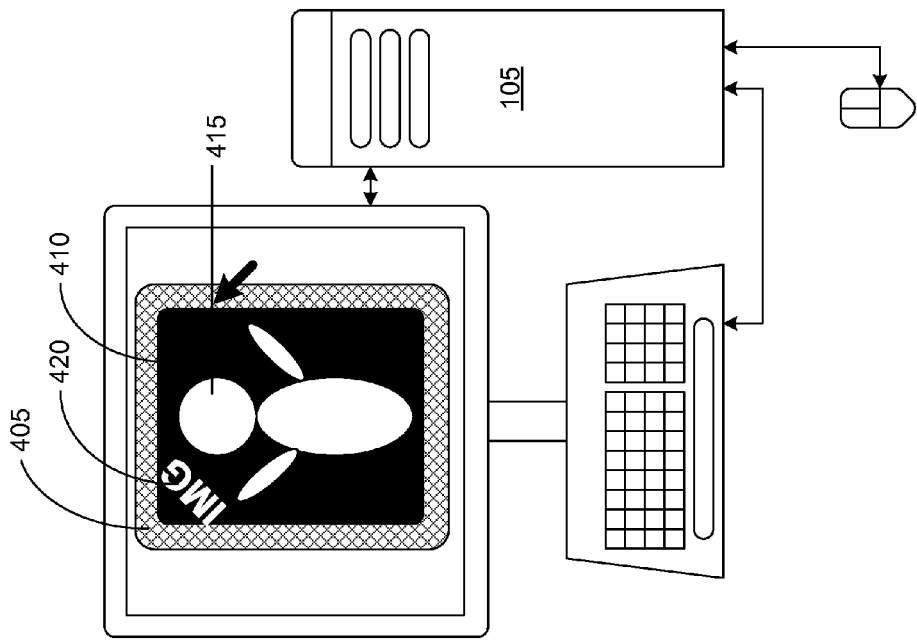
FIGS. 4A and 4B are examples of a system for modifying text displayed in digital media presentations.
Figure 4A:
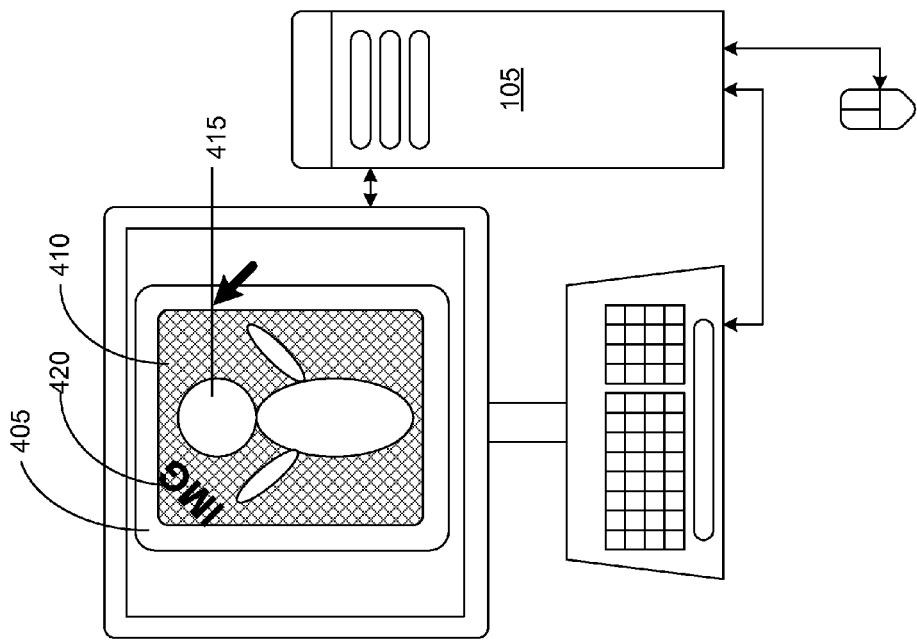

FIGS. 4A and 4B are examples of a system for modifying text displayed in digital media presentations. In some scenarios, a graphical element displayed in a digital media presentation can be text. In one example, a user positions a cursor adjacent to a graphical element and types the text. In response, the computing device 105 displays the text at the position of the cursor. In another example, a user selects text that is stored in a database of texts for displaying adjacent to a graphical element. In response, the computing device 105 displays the selected text at a default position in the digital media presentation. Further, in response to user input, the computing device 105 modifies the position of the text. In yet another example, the computing device 105 selects and displays text adjacent to a graphical element. In response to user input, the computing device 105 modifies the position of the text and the text itself.

In some implementations, in response to input, the computing device 105 displays a first graphical element 405 in a first layer in the user interface. Then, in response to input, the computing device 105 displays a second graphical element 410 in a second layer in the user interface. Further, the computing device 105 displays a digital image 415 and text 420 over the second graphical element 410. The computing device 105 can position the graphical elements, the digital image, and the text in a Z-order sequence. To do so, for example, the computing device 105 positions the layer on which the second graphical element 410 is displayed, above the layer on which the computing device 105 displays the first graphical element 405. The computing device 105 positions the latter layer above a common layer on which the computing device 105 displays both the digital image 415 and the text 420. The common layer on which the computing device 105 displays both the digital image 415 and the text 420 represents an XY plane on which the computing device 105 positions both the digital image 415 and the text 420. For example, the first graphical element 405 is a white background page, the second graphical element is a border having a color, and the digital image and the text are displayed within the border. The computing device 105 can select the text 420 by one of the aforementioned methods. In this manner, the awareness that a graphical element is positioned above a digital image causes the computing device 105 to trigger an event.

It will be appreciated that the computing device 105 can modify the Z-order and the positioning of graphical elements in the XY plane responsive to input. For example, the computing device 105 can position the first graphical element 405 above the second graphical element 410. Further, the computing device 105 can position the text 420 such that the digital image 415 is overlapped by the text 420. In such a scenario, the computing device 105 removes the text 420 from the XY plane represented by the common layer on which the digital image 415 is displayed and re-positions the text 420 in a Z-order sequence on a layer positioned above the layer on which the digital image 415 is displayed.

In a default implementation, the computing device 105 can receive input to associate a feature with the first graphical element 405 and display the first graphical element 405 with the associated feature. For example, in response to user input, the computing device 105 displays the first graphical element 405 as being solid and being white in color. Then, in response to input to display the second graphical element 410 over the first graphical element 405, the computing device 105 can determine if a feature associated with the second graphical element 410 is compatible with that associated with the first graphical element 405. If not, then the computing device 105 can automatically and dynamically modify the feature associated with the second graphical element 410 to be compatible with that of the first graphical element 405. For example, if the second graphical element 410 is associated with solid, white color, the computing device 105 determines that the solid, white color likely render the element 410 invisible when displayed over the first graphical element 405, and will likely negatively affect the aesthetic appearance of the digital media representation. In response, the computing device 105 automatically modifies the color of the second graphical element 410 to be a color that will be easily discerned when displayed over the solid, white background.

Similarly, when the computing device 105 receives input to display the digital image 415 over the second graphical element 410, the computing device 105 can modify the features associated with the first and the second graphical elements depending upon the features of the digital image 415. For example, by analyzing the pixel information, the computing device 105 identifies one or more prominent colors in the content of the digital image 415. The computing device 105 then determines if the color of the second graphical element 410 is compatible with the one or more prominent colors in the digital image 415. If not, then the computing device 105 automatically and dynamically modifies the color in the second graphical element 410 to be compatible with the prominent colors in the digital image 415. In addition, the computing device 105 determines if the modified color in the second graphical element 410 is compatible with the color in the first graphical element 405. If not, then the computing device 105 automatically and dynamically modifies the color in the first graphical element 405 to be compatible with the modified color in the second graphical element 410. In some scenarios, the computing device 105 additionally determines if the modified color in the first graphical element 405 is compatible with the prominent colors of the digital image, and if not, further modifies the color in the first graphical element 405 to be compatible with both the prominent colors in the digital image and the modified color in the second graphical element 410. Methods by which the computing device 105 tracks the modifications to the colors, and generally, to features of the graphical elements are described with reference to FIG. 6.

In some scenarios, the text 420 that is displayed on the common layer on which the digital image 415 is also displayed, is associated with features including a font, color, size, and the like. In a default implementation, the text 420 is associated with a default color. In response to input to display the text 420, the computing device 105 determines if the default color of the text 420 is compatible with the color of the second graphical element 410 and the prominent colors in the digital image 415. If not, then the computing device 105 automatically modifies the default color into a color that is compatible with the prominent colors in the digital image, and displays the text 420 in the modified color.

As shown in FIG. 4B, in some scenarios, the computing device 105 can receive input to modify a feature, for example, a color, of one of the graphical elements in the digital media presentation. For example, the computing device 105 receives input to modify a color of the second graphical element 410. In response, the computing device 105 automatically determines if the modified color of the second graphical element 410 is compatible with colors of the remaining graphical elements. For those graphical elements that the computing device 105 determines as having colors that are not compatible with the modified color of the second graphical element 410, the computing device 105 modifies the colors. Thus, in some implementations, the computing device 105 modifies the color of the text 420 to be of a color that is compatible with the colors of the remaining graphical elements.

It will be appreciated that, in response to detecting input to modify a feature in one graphical element, the computing device 105 need not modify the same feature in all the other graphical elements. For example, upon detecting input to position the text 420 over the digital image 415, the computing device 105 determines that color of the text 420 is not compatible with the prominent colors of the digital image 415 at the position at which the text 420 will be positioned. Rather than modifying a color of the text 420, the computing device 105 can modify a position of the text 420 over the digital image 415, i.e., re-position the text 420 to a position over the digital image 415 where the color of the text 420 is compatible with prominent colors of the new position. Alternatively, or in addition, the computing device 105 can re-position the text 420 to be displayed on the second graphical element 410 adjacent to but without overlapping the digital image 415. In some scenarios, the computing device 105 can alter a size of the text 420. In some scenarios, as an alternative to repositioning or changing the color of the text, the computing device 105 can display a gradient over a portion of the image and display the text over the gradient. The computing device 105 can select the gradient having a color against which the text will be prominently displayed.

Figure 5A:
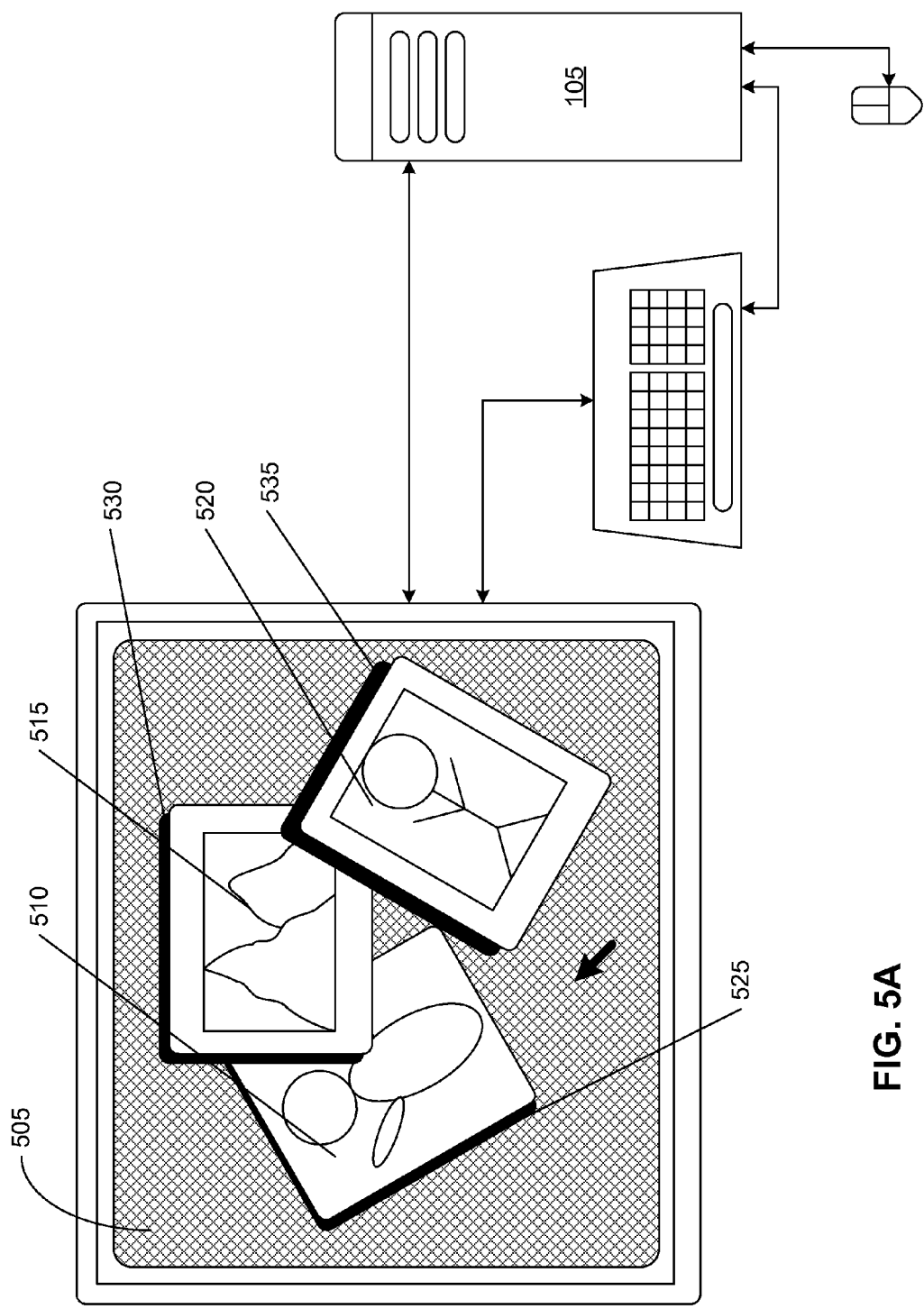
FIGS. 5A and 5B are examples of a system for displaying multiple graphical elements in a Z-order sequence.
Figure 5B:
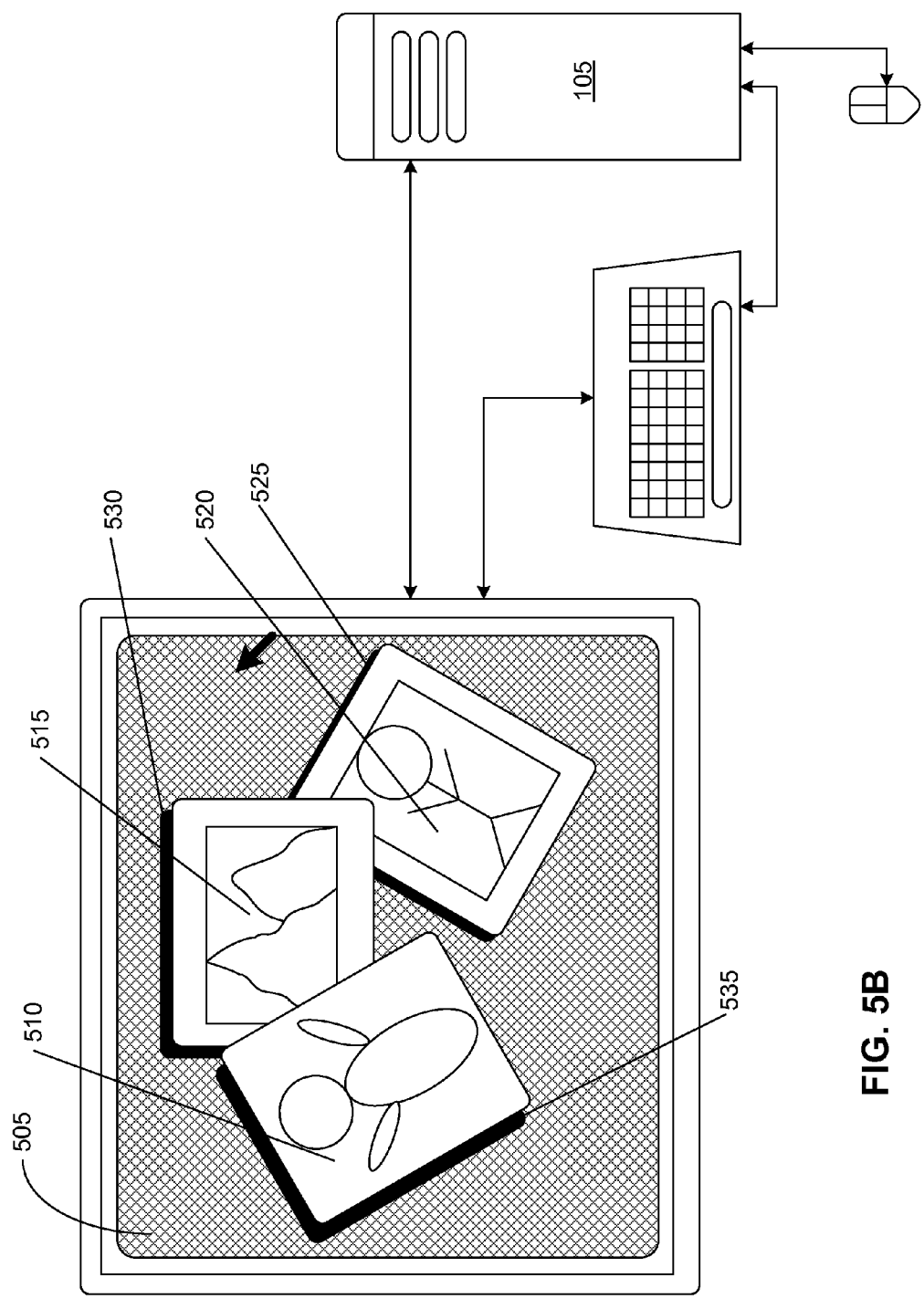

FIGS. 5A and 5B are examples of a system for displaying multiple graphical elements in a Z-order sequence. In some implementations, the computing device 105 can display a first graphical element 505 in a first graphical layer. Over the first graphical element 505, the computing device 105 can display multiple graphical elements either in a Z-order sequence or on a common layer or both. In some implementations, the computing device 105 can display a first digital image 510, a second digital image 515 and a third digital image 520 over each other, in that sequence. In some scenarios, a user can select each digital image individually. In some scenarios, the user can simultaneously select all three of the digital images. In some scenarios, in response to display digital images over the first graphical element 505, the computing device 105 can select the three digital images (for example, based on a shared characteristic) and display the selected images over the first graphical element 505. The computing device 105 can associated default sizes and orientations for each digital image, which the computing device 105 can change in response to input.

In some implementations, the computing device 105 can receive input to associate a drop-shadow with each digital image. A drop-shadow is a graphical element displayed adjacent to and behind a digital image. A drop-shadow can be filled with a solid, dark color, for example, black, and can offer an appearance of a shadow being cast by the digital image on the background. According to the Z-order sequence, the first digital image 510 is the bottom-most image and the third digital image 520 is the top-most image. Consequently, the drop-shadows can be displayed such that the first digital image 510 appears to cast the least prominent shadow and the third digital image 520 must appear to cast the most prominent shadow.

To display a drop-shadow for a digital image, the computing device 105 displays a graphical element adjacent to the digital image. The graphical element can be L-shaped and have a width filled with a solid, dark color. The computing device 105 can display the graphical element adjacent to two edges of the region that bounds the digital image, thereby presenting an appearance of a shadow. In some implementations, the computing device 105 can display the graphical element on the same layer on which the digital image is displayed. In alternative implementations, the computing device 105 can insert a layer between two digital images and display the graphical element in the inserted layer.

As shown in FIG. 5A, the computing device 105 displays a first graphical element 525, a second graphical element 530, and a third graphical element 535, adjacent to the first digital image 510, the second digital image 515, and the third digital image 520, respectively. Of the three graphical elements, the computing device 105 assigns the least width to the first graphical element 525 and the greatest width to the third graphical element 535. The computing device 105 can perform the steps of displaying the drop-shadow automatically in response to input to display a drop-shadow around the digital images.

The computing device 105 can modify positions of the digital images in the Z-order sequence in response to input. As shown in FIG. 5B, in response to input, the computing device 105 modifies the Z-order sequence such that the first digital image 510 is the top-most digital image and the third digital image 520 is the bottom-most digital image. The change in the Z-order sequence changes the appearances of the shadows of the digital images that have been re-ordered. In response to the change in the position of the first digital image 510 and the third digital image 520 in the Z-order sequence, the computing device 105 automatically and dynamically modifies the drop-shadows associated with the two digital images. For example, the computing device 105 re-positions the third graphical element 535 adjacent to the first digital image 510 and the first graphical element 525 adjacent to the third digital image 520. Thus, in response to input to re-position the digital images, the computing device 105 automatically and dynamically creates an appearance that the third digital image 520 casts the least prominent shadow whereas the first digital image 510 casts the most prominent shadow.

Figure 5C:
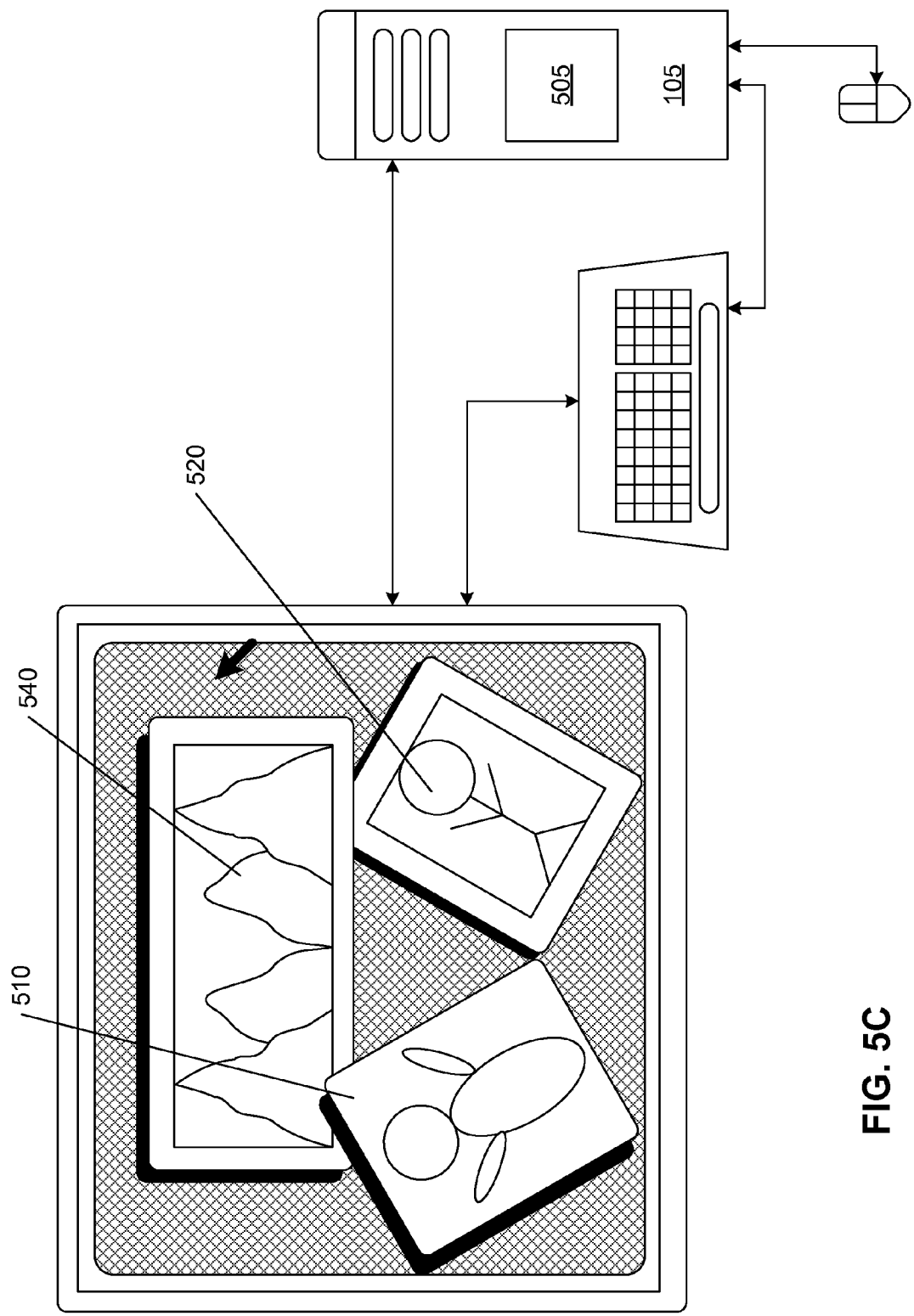
FIG. 5C is an example of a system for re-positioning graphical elements in response to modifications to sizes of graphical elements.

In the system described with reference to FIGS. 5A and 5B, the computing device 105 re-positioned graphical elements in the Z-order in response to input. In some implementations, the computing device 105 can re-position graphical elements on the same XY plane in response to input. FIG. 5C is an example of a system for re-positioning graphical elements in response to modifications to sizes of graphical elements. In a default implementation, when the computing device 105 receives input to display three digital images (510, 515, and 520), then the computing device 105 can display each landscape image with an aspect ratio (ratio of width to height of the bounded region within which a digital image is displayed) of 4:3 and each portrait image in an aspect ratio of 3:4. Thus, as shown in FIG. 5B, the second digital image 515 is displayed with a 4:3 aspect ratio, and each of the first digital image 510 and the third digital image 520 is displayed with a 3:4 aspect ratio.

The computing device 105 can subsequently receive input to replace the second digital image 515 with a fourth digital image 540 that has an aspect ratio that is greater than the default aspect ratio. For example, the fourth digital image 540 can be a panoramic digital image formed using several 4:3 aspect ratio landscape digital images. As shown in FIG. 5C, the space occupied by the fourth digital image 540 is greater than the space occupied by the second digital image 515. If the fourth digital image 540 were displayed in place of the second digital image 515, then significant portions of the first digital image 510 or the second digital image 520 or both can be overlapped by the fourth digital image 540. The computing device 105 determines the overlap and can automatically and dynamically re-position each of the first digital image 510 and the second digital image 520 to minimize or eliminate the overlap. In doing so, the computing device 105 can maintain the Z-order sequence of the first, fourth, and third digital images (in that order).

It will be appreciated that replacing a second digital image 515 with a fourth digital image 540 is one example of a scenario in response to which the computing device 105 repositions digital images. In alternative scenarios, the computing device 105 can reposition digital images in response to receiving input to change a dimension of the second digital image 515. For example, the computing device 105 receives input to increase a size of the bounded region in which the second digital image 515 is displayed to 200%. In response, the computing device 105 increases the size of the bounded region and also repositions the first and third digital images to continue to be visible. In some scenarios, the computing device 105 can receive input to decrease a size of the bounded region in which the second digital image 515 is displayed. In response, the computing device 105 can reposition the remaining images, for example, by bringing the images closer to each other, such that the Z-order sequence in which the images are arranged is maintained.

As shown in FIG. 5C, the computing device 105 can be operatively coupled to a data storage device 505, for example, a hard disk, in which the features associated with the graphical elements are stored. FIG. 6 is an example of a table in which features associated with graphical elements are listed. In some implementations, the features are stored in a computer-readable and computer-searchable tables that have multiple columns. In a column of the table, the set of features (feature 1, feature 2, . . . , feature n) can be stored. For each feature in the set of features, a set of compatible features and a set of incompatible features can be stored in corresponding columns. It will be appreciated that a computer-searchable table is an example of a data structure in which the features can be stored. The features can be stored in alternative data structures. Each feature associated with a graphical element can be associated with a corresponding pointer using which the feature can be identified.

In some implementations, the computing device 105 can track the features associated with the various graphical elements in a digital media presentation. For each instance that the computing device 105 receive input to display a graphical element, the computing device 105 can store the graphical element and its associated features in a computer-searchable database. In this manner, the computing device 105 can broadcast the features associated with each graphical element selected for display. In response to detecting input to select a new graphical element, the computing device 105 can check if the new features associated with the new graphical element are compatible or incompatible with the features of the previously displayed graphical elements. To do so, in some implementations, the computing device 105 can identify the features stored in the computer-searchable database and compare the new features and the stored features, for example, using the computer-searchable table described with reference to FIG. 6.

Based on the comparing, the computing device 105 can modify the features of the displayed graphical elements to be compatible with the new features. Subsequently, the modified features can be stored in the database. The broadcasting of the features of the graphical elements allows the computing device 105 to dynamically modify features of graphical elements when the computing device 105 determines incompatibility of features. For example, the computing device 105 displays a first graphical element, a second graphical element, and a third graphical element, each having a first feature, a second feature, and a third feature, respectively. When the computing device 105 receives input to display the third graphical element, the computing device 105 compares the third feature with the first feature and the second feature, both of which are stored in the computer-searchable database. Upon detecting incompatibilities, the computing device 105 can dynamically modify the features of either or both of the first feature and second feature. It will be appreciated that graphical elements can have multiple features. For example, color is described by sixteen features; busy-ness of a digital image is described by five features; sereneness is described by six features, and the like. By broadcasting each of the multiple features, i.e., storing each of the multiple features in a computer-searchable database, the features can be made available to the computing device 105 to determine incompatibilities.

In response, the computing device 105 can dynamically modify features as and when the computing device 105 determines the incompatibilities.

In some implementations, all the graphical elements in a presentation can register the associated features. By doing so, when the computing device 105 detects that a feature of an image has been modified by input or that a new image having a new feature has been added to the presentation, the computing device 105 can identify features of existing graphical elements that need to be modified based on the features that have been registered by the existing graphical elements.

Figure 7:
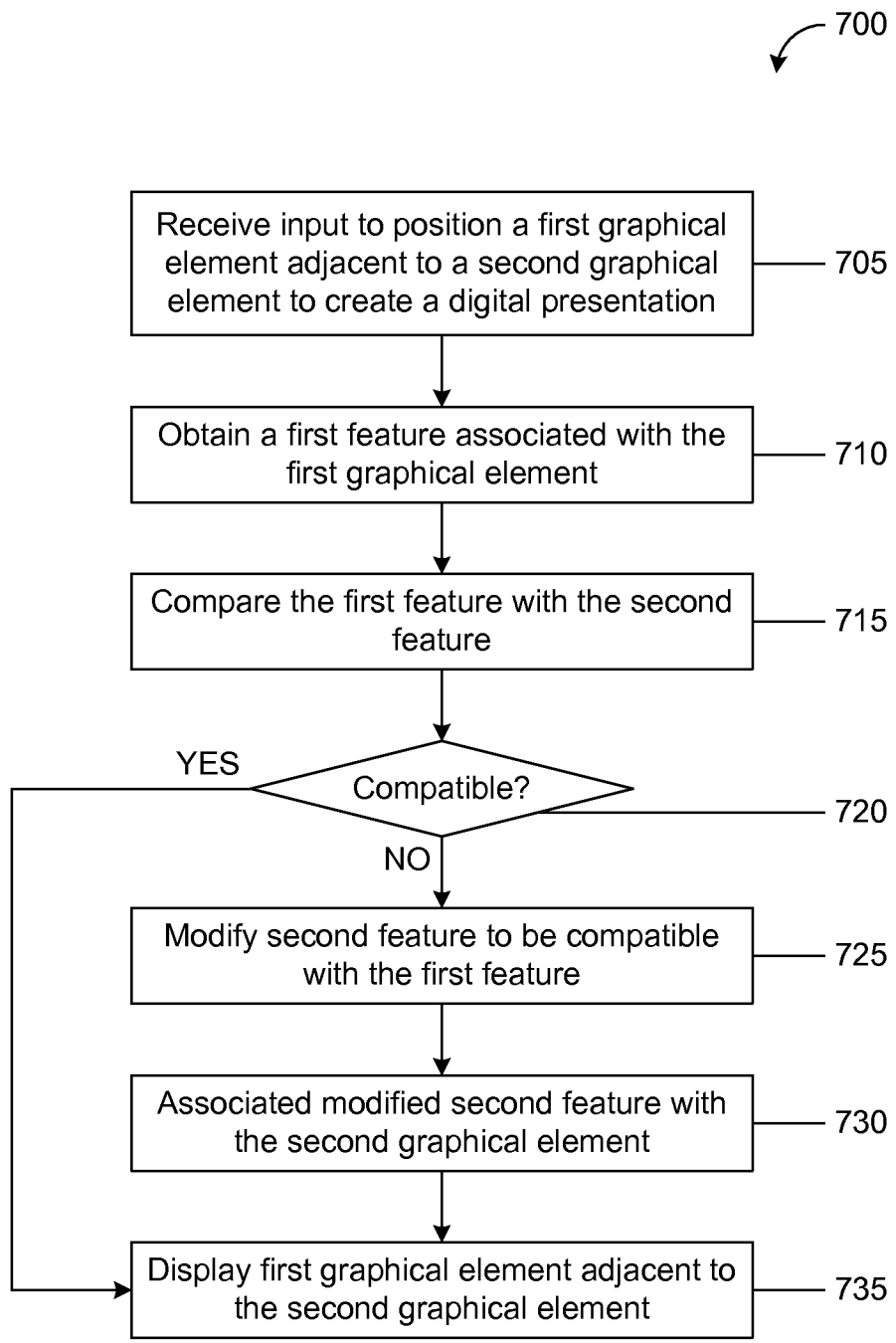
FIG. 7 is a flow chart of an example process to display graphical elements adjacent to each other.

FIG. 7 is a flow chart of an example process 700 to display graphical elements adjacent to each other. The process 700 can be implemented in a data processing system by computer software that performs the operations of the process 700, for example, a system like system 100. The process 700 receives input to position a first graphical element adjacent to a second graphical element to create a digital presentation (step 705). Each graphical element is associated with a corresponding feature. The process 700 obtains a first feature associated with the first graphical element (step 710). The process 700 compares the first feature with a second feature associated with a second graphical element (step 715). The process 700 checks to determine if the first feature is compatible with the second feature (step 720). If the process 700 determines that the first feature is not compatible with the second feature, then the process modifies the second feature to be compatible with the first feature (step 725). The process 700 associates the modified second feature with the second graphical element (step 730). The process 700 displays the first graphical element adjacent to the second graphical element (step 735).

Figure 8:
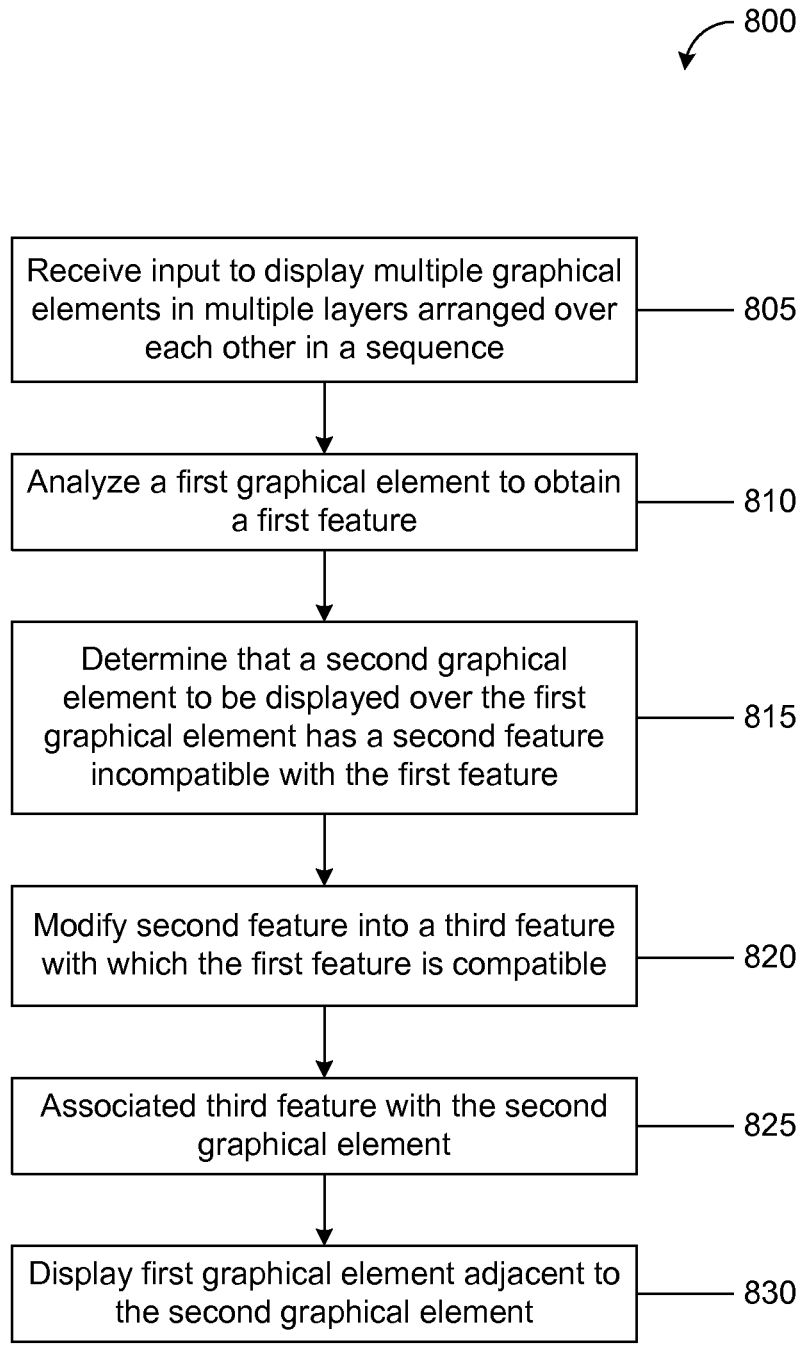
FIG. 8 is a flow chart of an example process to display graphical elements adjacent to each other.

FIG. 8 is a flow chart of an example process 800 to display graphical elements adjacent to each other. The process 800 receives input to display multiple graphical elements in multiple layers arranged over each other in a sequence (step 805). The process 800 analyzes a first graphical element to obtain a first feature (step 810). The process 800 determines that a second graphical element to be displayed over the first graphical element has a second feature incompatible with the first feature (step 815). The process 800 modifies the second feature into a third feature with which the first feature is compatible (step 820). The process 800 associates the third feature with the second graphical element (step 825). The process 800 displays the first graphical element adjacent to the second graphical element (step 830).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example, multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (for example, an HTML page) to a client device (for example, for purposes of displaying data to and receiving user input from a user interacting with the client device). Data generated at the client device (for example, a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The operations described with reference to the aforementioned figures can be performed individually or in combinations. In some scenarios, a digital media presentation can include a spread that includes multiple digital sheets, each of which displays one or more graphical elements. The graphical elements selected for display across the multiple digital sheets can be collectively represented by a single theme, for example, a "Travel" theme, a "Vacation" theme, an "Asian Travel" theme, an "Old World" theme, and the like. For each theme, one or more graphical elements including art work elements can previously be stored in a computer-searchable database. Upon determining a theme, the stored graphical elements associated with the theme can be displayed in the multiple digital sheets. The digital images that form the theme can be displayed across the multiple digital sheets among the displayed graphical elements. Techniques for grouping digital images to identify a common theme are described in U.S. Pat. No. 8,611,678 issued Dec. 17, 2013, entitled "Grouping Digital Media Items Based on Shared Features," the entire contents of which are incorporated herein by reference. Techniques for identifying a common theme that collectively represents multiple images are described in U.S. Pat. No. 8,988,456 issued Mar. 24, 2015, entitled "Generating Digital Media Presentation Layouts Dynamically Based on Image Features," the entire contents of which are incorporated herein by reference.

The user interface that is displayed in the display device can be configured to include multiple user interface controls including drop down menus, check boxes, radio buttons, and the like, that enable a user to provide input to the computing device 105. As described previously, multiple digital images can be displayed adjacent to corresponding graphical elements such that a graphical element is displayed as a frame surrounding a digital image. Features associated with each frame can be individually modified in response to receiving input. For example, a width of a first frame can be increased while that of a second frame can be decreased. Instead of a frame, a graphical element that has a mesh-type appearance can be positioned adjacent to a digital image such that the digital image is displayed as being segmented by the mesh.

In some implementations, in response to input, the computing device 105 can defer the modification of features of graphical elements. For example, the computing system 105 detects that a graphical element is not to be more than 80% covered. This feature of the graphical element is broadcast and stored in the computer-searchable database. However, any modification to ensure that the graphical element is not more than 80% covered cannot be performed unless another graphical element is positioned to cover more than 80% of the graphical element. In such implementations, the computing device 105 can store the feature to be deferred and can perform the modification in response to detecting the position of the other graphical element.

In some implementations, the computing device 105 can select preferred features, for example, colors based on previously created digital media presentations. For example, upon receiving input to display a graphical element in a new digital media presentation, the computing device 105 determines if the graphical element was included in a previously created digital media presentation, and if yes, then identifies a color that was associated with the graphical element. The computing device 105 then displays the graphical element with the identified color in the new presentation. In some implementation, the computing device 105 determines that the user frequently modified a default color associated with a graphical element. In response, the computing device 105 can automatically modify the default color to a different color, for example, a color that the user previously used.

What is claimed is:

1. A method implemented by one or more data processing apparatuses comprising:

receiving input specifying first and second digital images to be used to create a digital presentation, each digital image associated with a corresponding plurality of features including at least two of a size, a color, a rotation, and an orientation;

obtaining, by the data processing apparatus, a first plurality of features associated with the first digital image, the first plurality of features including at least two of a size, a color, a rotation, and an orientation;

comparing, by the data processing apparatus, each feature in the first plurality of features with each corresponding feature in a second plurality of features associated with the second digital image to determine whether the first plurality of features is compatible with the second plurality of features, the second plurality of features including at least two of a size, a color, a rotation, and an orientation;

modifying, by the data processing apparatus, each feature in the second plurality of features to be compatible with each corresponding feature in the first plurality of features, in response to determining that each feature in the second plurality of features is to be modified based on the comparing, each modified feature in the second plurality of features selected from among one or more features with which each corresponding feature in the first plurality of features is compatible, wherein a feature in the first plurality of features and a corresponding feature in the second plurality of features are dynamically modifiable based on other features of the digital presentation; and displaying, by the data processing apparatus, the first digital image substantially adjacent to the second digital image in response to the input to create the digital presentation, the second digital image being associated with each modified feature in the second plurality of features.

2. The method of claim 1, further comprising determining that each feature the second plurality of features is to be modified based on the comparing.

3. The method of claim 1, wherein the input specifying the first and the second digital images to be used to create the digital presentation further comprises input to position the first digital image substantially adjacent to the second digital image.

4. The method of claim 3, displaying the first digital image substantially adjacent to the second digital image comprises positioning the first digital image to at least partially overlap the second digital image.

5. The method of claim 1, wherein each of the first digital image and the second digital image includes a digital image.

6. The method of claim 5, wherein each of the first digital image and the second digital image is selected from a plurality of digital images stored in a database of digital images in response to the input.

7. The method of claim 5, wherein each of the first digital image and the second digital image is captured using an image capturing device.

8. The method of claim 1, wherein modifying each feature of the second plurality of features comprises modifying each feature of the second plurality of features automatically and dynamically upon receiving the input.

9. The method of claim 1, wherein the first digital image and the second digital image are each displayed on a corresponding graphical layer of a plurality of graphical layers that are arranged in an order and are configured to display digital images in the order.

10. The method of claim 9, wherein the plurality of graphical layers are arranged in a Z-order such that a graphical layer is displayed over another graphical layer, wherein the first digital image displayed on a first graphical layer is positioned below the second digital image displayed on a second graphical layer.

11. The method of claim 10, the method further comprising:
receiving input to position the first digital image above the second digital image;
displaying the first digital image on the second graphical layer and the second digital image on the first graphical layer;
comparing a modified second feature with a first feature of the first plurality of features;
determining that the first feature is to be modified;
automatically and without user intervention, modifying the first feature to be compatible with the modified second feature; and
displaying the first digital image having the modified first feature above the second digital image having the modified second feature.

12. The method of claim 1, wherein obtaining the first feature associated with the first digital image further comprises analyzing metadata associated with the first digital image.

13. The method of claim 1, wherein the first digital image includes a digital image, and wherein obtaining the first feature associated with the first digital image further comprises analyzing content of the digital image.

14. The method of claim 13, wherein analyzing the content of the digital image comprises obtaining pixel information that describes the content, the pixel information including color.

15. The method of claim 1, further comprising:
storing a plurality of features including the first plurality of features and the second plurality of features in a computer-readable database; and
for each stored feature, storing, in the database, one or more features with which the stored feature is compatible and one or more features with which the stored feature is incompatible.

16. The method of claim 15, wherein comparing each feature of the first plurality of features with each feature of the second plurality of features comprises:
searching for each feature of the first plurality of features in the database; and
searching the database to determine if each feature of the second plurality of features is included among the one or more features with which each feature of the first plurality of features is compatible or among the one or more features with which each feature of the first plurality of features is incompatible.

17. The method of claim 1, wherein displaying the first digital image substantially adjacent to the second digital image comprises displaying the first digital image over the second digital image, and wherein the method further comprises:
determining that displaying the first digital image over the second digital image causes a portion of the first digital image to be hidden from display;
determining that the portion of the first digital image that will be hidden from display is greater than a threshold portion by which an image can be hidden from display; and
in response to determining that the portion of the first digital image is greater than the threshold portion, moving the first digital image from a first location in the digital presentation to a second location in the digital presentation, wherein, at the second location, the portion of the first digital image that will be hidden from display is less than the threshold portion.

18. A non-transitory computer storage medium encoded with a computer program comprising instructions executable by data processing apparatus to perform operations comprising:
receiving input to display a plurality of digital images on a plurality of layers arranged over each other in a sequence to create a digital presentation, each digital image having a plurality of features comprising at least two of a size, a color, a rotation, and an orientation;
analyzing a first digital image to be displayed on a first layer to determine a first plurality of features of the first digital image, the first plurality of features including at least two of a size, a color, a rotation, and an orientation;
determining that a second digital image to be displayed on a second layer has a second plurality of features with which the first plurality of features is incompatible, the second plurality of features including at least two of a size, a color, a rotation, and an orientation;
modifying the second plurality of features of the second digital image into a third plurality of features with which the first plurality of features is compatible, wherein a feature in the first plurality of features and a feature in the third plurality of features are dynamically modifiable based on other features of the digital presentation; and displaying the plurality of digital images on the plurality of layers, the plurality of digital images including the first digital image having the first plurality of features displayed on the first layer and a second digital image having the third plurality of features displayed on the second layer.

19. The medium of claim 18, wherein each of the plurality of layers are two dimensional in the XY plane, wherein arranging the plurality of layers over each other in the sequence comprises arranging the plurality of layers in the Z direction.

20. The medium of claim 18, wherein the first digital image includes content, wherein analyzing the first digital image comprises obtaining pixel information that describes the content from the first digital image.

21. The medium of claim 20, wherein the first plurality of features is an orientation of the digital image, the orientation including either a landscape orientation or a portrait orientation.

22. The medium of claim 18, wherein the first digital image includes text and the first plurality of features includes a font in which the text is written, wherein analyzing the first digital image comprises obtaining the text and the font.

23. The medium of claim 18, the operations further comprising:
analyzing the second digital image to be displayed on the second layer to determine the second plurality of features of the second digital image; and
comparing the first plurality of features with the second plurality of features and a position of the first layer with a position of the second layer in the sequence.

24. The medium of claim 23, wherein the first plurality of features comprises a first color and the second plurality of features comprises a second color, wherein the operations for comparing the first plurality of features with the second plurality of features and the position of the first layer with the position of the second layer in the sequence comprises determining that the first color and the second color share a similarity.

25. The medium of claim 24, wherein the operations for modifying the second plurality of features of the second digital image into a third plurality of features with which the first plurality of features is compatible comprises modifying the second color into a third color that contrasts the first color.

26. The medium of claim 18, wherein the first plurality of features and the second plurality of features comprise drop-shadows displayed on a first background of the first digital image and a second background of the second digital image, respectively, wherein the first layer is positioned below the second layer, the operations further comprising displaying a drop-shadow on the second background more prominently relative to a drop-shadow on the first background.

27. The medium of claim 26, wherein the operations for modifying the second plurality of features of the second digital image into a third plurality of features with which the first plurality of features is compatible comprises:
receiving input to position the second layer below the first layer; and
modifying the drop-shadow displayed on the first background to be more prominent than the drop-shadow displayed on the second background, wherein the modified drop-shadow is included in the third plurality of features.

28. The medium of claim 18, the operations further comprising:
storing a plurality of features in a database; and
for each of the plurality of features, storing in the database, one or more compatible features and one or more incompatible features.

29. The medium of claim 28, wherein the operations for determining that the second digital image to be displayed on the second layer has the second plurality of features with which the first plurality of features is incompatible comprises:
searching the database for the second plurality of features;
identifying, in the database, the one or more features with which the second plurality of features is incompatible; and
identifying the first plurality of features among the one or more identified features with which the second plurality of features is incompatible.

30. The medium of claim 18, wherein displaying the first digital image on the first layer and the second digital image on the second layer comprises displaying the first digital image over the second digital image, and wherein the operations further comprise:
determining that displaying the first digital image over the second digital image causes a portion of the first digital image to be hidden from display;
determining that the portion of the first digital image that will be hidden from display is greater than a threshold portion by which an image can be hidden from display; and
in response to determining that the portion of the first digital image is greater than the threshold portion, moving the first digital image from a first location in the digital presentation to a second location in the digital presentation, wherein, at the second location, the portion of the first digital image that will be hidden from display is less than the threshold portion.

31. A system comprising:
one or more computers; and
a computer-readable medium tangibly encoding software instructions executable by the one or more computers to perform operations comprising:
receiving input to position a second graphical element over a first graphical element to create a digital presentation, each graphical element being associated with a corresponding plurality of features comprising at least two of a size, a color, a rotation, and an orientation, wherein a feature in a first plurality of features associated with the first graphical element and a feature in a second plurality of features associated with the second graphical element are dynamically modifiable based on other features of the digital presentation;
analyzing the first graphical element to obtain a plurality of first features associated with the first graphical element, the plurality of first features including at least two of a size, a color, a rotation, and an orientation;
determining a second feature that is compatible with each of the plurality of first features;
applying the second feature to the second graphical element; and
displaying the second graphical element over the first graphical element in response to the input to create the digital presentation, the first graphical element being associated with the plurality of first features and the second graphical element being associated with the applied second feature.

32. The system of claim 31, further comprising:
receiving input to modify the second feature;

determining that the modified second feature is incompatible with each of the plurality of first features; and modifying the second feature automatically and dynamically upon receiving the input into a different second feature that is different from the modified second feature specified in the input and that is compatible with each of the plurality of first features.

33. The system of claim 31, wherein the first graphical element and the second graphical element are each displayed on a corresponding graphical layer of a plurality of graphical layers that are arranged over each other in an order and are configured to display graphical elements in the order.

34. The system of claim 31, the operations further comprising:

receiving input to position the first graphical element below the second graphical element;

comparing the applied second feature with one or more first features of the plurality of first features;

determining that a first feature of the one or more first features is to be modified;

modifying the first feature to be compatible with the applied second feature; and displaying the first graphical element having the modified first feature below the second graphical element having the applied second feature.

35. The system of claim 31, wherein obtaining the plurality of first features associated with the first graphical element further comprises analyzing metadata associated with the first graphical element.

36. The system of claim 31, wherein the first graphical element includes a digital image, and wherein obtaining the plurality of first features associated with the first graphical element further comprises analyzing content of the digital image.

37. The system of claim 36, wherein analyzing the content of the digital image comprises obtaining pixel information that describes the content, the pixel information including color.

38. The system of claim 31, further comprising:

storing the plurality of first and the second feature in a computer-readable database; and for each stored feature, storing, in the database, one or more features with which the stored feature is compatible and one or more features with which the stored feature is incompatible.

39. The system of claim 38, wherein determining a second feature that is compatible with each of the plurality of first features comprises:

searching for the second feature in the database; and searching the database to determine if the second feature is included among the one or more features with which the each of the plurality of first features is compatible or among the one or more features with which the each of the plurality of first features is incompatible.

40. The system of claim 31, wherein the one or more computers comprise a server operable to interact with a device through a data communication network, and the device is operable to interact with the server as a client.

41. The system of claim 31, wherein displaying the second graphical element over the first graphical element further comprises:

determining that displaying the second graphical element over the first graphical element causes a portion of the second graphical element to be hidden from display;

determining that the portion of the second graphical element that will be hidden from display is greater than a threshold portion by which an image can be hidden from display; and in response to determining that the portion of the second graphical element is greater than the threshold portion, moving the second graphical element from a first location in the digital presentation to a second location in the digital presentation, wherein, at the second location, the portion of the second graphical element that will be hidden from display is less than the threshold portion.

\* \* \* \* \*